United States Patent
Bashkirov et al.

(10) Patent No.: US 11,763,508 B2
(45) Date of Patent: Sep. 19, 2023

(54) DISAMBIGUATION OF POSES

(71) Applicant: Sony Interactive Entertainment Inc., Tokyo (JP)

(72) Inventors: Sergey Bashkirov, Salida, CA (US); Michael Taylor, San Mateo, CA (US)

(73) Assignee: SONY INTERACTIVE ENTERTAINMENT INC.

( * ) Notice: Subject to any disclaimer, the term of this patent is extended or adjusted under 35 U.S.C. 154(b) by 0 days.

(21) Appl. No.: 17/095,481

(22) Filed: Nov. 11, 2020

(65) Prior Publication Data

US 2022/0148247 A1    May 12, 2022

(51) Int. Cl.
| | |
|---|---|
| *G06T 13/40* | (2011.01) |
| *G06T 7/70* | (2017.01) |
| *G06T 17/00* | (2006.01) |
| *G06T 7/13* | (2017.01) |
| *G06T 7/11* | (2017.01) |

(52) U.S. Cl.
CPC .............. *G06T 13/40* (2013.01); *G06T 7/11* (2017.01); *G06T 7/13* (2017.01); *G06T 7/70* (2017.01); *G06T 17/00* (2013.01); *G06T 2207/10016* (2013.01)

(58) Field of Classification Search
CPC .................................. G06T 7/75; G06T 13/40
See application file for complete search history.

(56) References Cited

U.S. PATENT DOCUMENTS

| | | |
|---|---|---|
| 11,263,796 B1 | 3/2022 | Bashkirov et al. |
| 2010/0111370 A1* | 5/2010 | Black ........................ G06T 7/75 |
| | | 382/111 |
| 2011/0267344 A1 | 11/2011 | Germann et al. |

(Continued)

FOREIGN PATENT DOCUMENTS

WO      2017201506 A1    11/2017

OTHER PUBLICATIONS

Carranza, Joel, et al. "Free-viewpoint video of human actors." ACM transactions on graphics (TOG) 22.3 (2003): 569-577. (Year: 2003).*

(Continued)

*Primary Examiner* — Ryan McCulley
(74) *Attorney, Agent, or Firm* — JDI PATENT; Joshua Isenberg; Robert Pullman

(57) ABSTRACT

Computer animation involving pose disambiguation is disclosed. Two or more source segmentation masks are generated from corresponding contemporaneous video images of a character from different points of view. A three-dimensional model of an animation character corresponding to the character in the two or more contemporaneous video images is generated. Two or more different target segmentation masks corresponding to different views of the animation character corresponding to the character in the two or more video images. Each target segmentation mask is compared to a corresponding source segmentation mask from the comparison it is determined whether a pose of the three-dimensional model corresponds to a pose of the character in the video images. The model is used to generate a frame of animation of the animated character when the pose of model corresponds to the pose of the character in the video images.

27 Claims, 7 Drawing Sheets

(56) References Cited

U.S. PATENT DOCUMENTS

| | | | | |
|---|---|---|---|---|
| 2011/0298827 | A1* | 12/2011 | Perez | G06V 40/28 |
| | | | | 345/647 |
| 2013/0250050 | A1* | 9/2013 | Kanaujia | H04N 13/106 |
| | | | | 348/42 |
| 2015/0193940 | A1 | 7/2015 | Shoji | |
| 2017/0132827 | A1 | 5/2017 | Tena et al. | |
| 2017/0358118 | A1 | 12/2017 | Bard et al. | |
| 2020/0035010 | A1 | 1/2020 | Kim et al. | |
| 2020/0202534 | A1 | 6/2020 | Steele | |
| 2020/0234498 | A1* | 7/2020 | Price | G06K 9/00671 |
| 2021/0150728 | A1 | 5/2021 | Ahmed et al. | |
| 2021/0158593 | A1 | 5/2021 | Li et al. | |
| 2021/0287430 | A1* | 9/2021 | Li | G06T 17/20 |
| 2022/0143820 | A1 | 5/2022 | Bashkirov et al. | |
| 2022/0148247 | A1 | 5/2022 | Bashkirov et al. | |

OTHER PUBLICATIONS

Magnor, Marcus, and Christian Theobalt. "Model-based analysis of multi-video data." 6th IEEE Southwest Symposium on Image Analysis and Interpretation, 2004.. IEEE, 2004. (Year: 2004).*

Moeslund, Thomas B., Adrian Hilton, and Volker Krüger. "A survey of advances in vision-based human motion capture and analysis." Computer vision and image understanding 104.2-3 (2006): 90-126. (Year: 2006).*

Chen, Yixin, et al. "Holistic++ scene understanding: Single-view 3d holistic scene parsing and human pose estimation with human-object interaction and physical commonsense." Proceedings of the IEEE/CVF International Conference on Computer Vision. 2019. (Year: 2019).*

"Stability." Merriam-Webster.com Thesaurus, Merriam-Webster, May 5, 2016, https://web.archive.org/web/20160505162245/https://www.merriam-webster.com/thesaurus/stability. Accessed Feb. 22, 2023. (Year: 2016).*

Arthur Juliani "Simple Reinforcement Learning with Tensorflow Part 8: Asynchronous Actor-Critic Agents (A3C)" Medium, Dated: Dec. 16, 2016, Available at: https://medium.com/emergent-future/simple-reinforcement-learning-with-tensorflow-part-8-asynchronous-actor-critic-agents-a3c-c88f72a5e9f2.

Arthur Juliani, "Simple reinforcement Learning with Tensorflow Part 0: Q-learning with Tables and Neural Networks" Medium, dated: Aug. 25, 2016. Available at: https://medium.com/emergent-future/simple-reinforcement-learning-with-tensorflow-part-0-q-learning-with-tables-and-neural-networks-d195264329d0.

Arthur Juliani, "Simple Reinforcement Learning with Tensorflow: Part 2—Policy-based Agents" Medium, Dated: Jun. 24, 2016. Available at: https://medium.com/@awjuliani/super-simple-reinforcement-learning-tutorial-part-2-ded33892c724.

Coulom, Remi "Apprentissage par renforcement utilsant des resaux de neurones, avec des applications au control moteur" PHD Thesis Institute Nat. Polytech of Grenoble Jun. 19, 2002.

Ghoshavi, Abhijit "Neural Networks and Reinforcement Learning" Slide presentation Dept. of Eng. Mgmt. and Sys. Eng. Missouri Univ. of Sci. and Tech. Accessed Nov. 6, 2019.

Kniewasser, Gerhard et al. "Reinforcemetn Learning with Dynamic Movement Primitives—DMPs" Dept. of Theoretical Comp. Sci. Univ. of Tech., Graz (2013) Accessed Nov. 6, 2019.

Kober, Jens et al. "Reinforcement Learning to Adjust Robot Movements to New Situations" Proceedings of the Twenty-Second Int. Joint Conf. on Artificial Intelligence p. 2650-2655 Accessed Nov. 6, 2019.

Peng, Xue Bin, and Michiel van de Panne. "Learning Locomotion Skills Using DeepRL." Proceedings of the ACM SIGGRAPH / Eurographics Symposium on Computer Animation—SCA '17 (2017).

Sepp Hochreiter et al., "Long Short-Term Memory", Neural Computation, 9(8) 1735-1780, 1997, Cambridge, MA.

Zaiqiang Wu, et al. "Analytical Derivatives for Differentiable Renderer: 3D Pose estimation by Silhouette Consistency" Zhejiang University, ArXiv:1906.07870v1, Jun. 19, 2019 available at: https://arxiv.org/pdf/1906.07870v1.pdf.

U.S. Appl. No. 17/095,518, filed Nov. 11, 2020, Michael Taylor.

International Search Report and Written Opinion dated Dec. 7, 2021 for International Patent Application No. PCT/US2021/058394.

International Search Report dated Dec. 7, 2021 for International Patent Application No. PCT/US2021/058398.

Notice of Allowance for U.S. Appl. No. 17/095,518, dated Oct. 29, 2021.

Complete European Search Report for European Patent Application 2221114.8 dated May 11, 2023.

Javier Escalera Selva Castello: "A Comprehensive Survey on Deep Future Frame Video Prediction", Jan. 13, 2018, XP055591799, Available at: https://upcommons.upc.edu/bitstream/handle/2117/118121/126510.pdf.

Non-Final Office Action for U.S. Appl. No. 17/680,912, dated Jun. 9, 2023.

* cited by examiner

DISAMBIGUATION OF POSES

FIELD OF THE DISCLOSURE

The present application relates to computer animation and more specifically to determining pose in generating animation from video.

BACKGROUND OF THE DISCLOSURE

Computer animation generally refers to the process used for digitally generating animated images. Modern computer animation usually uses 3D computer graphics to generate an image. To create the illusion of movement, a computer-generated image is displayed and repeatedly replaced (e.g., at a rate of 24, 25, or 30 frames/second) by a new image that is similar to it but advanced slightly in time. Computer animation techniques can achieve the same illusion of movement traditionally associated with television and motion pictures. Computer animation may be thought of as a digitally-implemented stop motion technique that uses a computer to generate the frames of moving images. Use of digital computing allows the use of 3D models to implement more detailed and realistic animation. Computer animation provides for greater control and flexibility than more traditional physically-based processes, such as use of miniatures for effects shots, or hiring extras for crowd scenes. Modern computer animation systems and software can create images that would not be feasible using any other technology.

In most 3D computer animation systems, an animator creates a simplified representation of segments that make up a character's anatomy. This simplified representation can be thought of as a skeletal model. The segments are arranged into a default position, sometimes called a bind pose, or T-Pose for the figure. The position of each segment is defined by animation variables, which, taken together, define the pose of the figure. In human and animal characters, many parts of the skeletal model may correspond to actual bones, but skeletal animation can also be used to animate other things including anthropomorphic objects such as humanoid robots or otherwise inanimate objects that an animator wishes to portray as if they were animate. The computer uses the model to compute the exact position and orientation of that certain character, which is eventually rendered into an image. Thus by changing the animation variable values over time, the animator creates motion by making the character move from frame to frame.

There are several methods for generating the animation variable values to obtain realistic motion. Traditionally, animators manipulate these values directly. Although this could be done by setting values for every frame, they are more commonly set at strategic points (frames) in time and the computer interpolates or "tweens" between them in a process called keyframing.

Newer methods called motion capture make use of live action footage. When computer animation is driven by motion capture, a real performer acts out the scene as if they were the character to be animated. The performer's motion is recorded to a computer using video cameras and markers at key points, e.g., joints and extremities, and the performance is then applied to an animated character. Recently, techniques have been developed that use motion capture data as a reference in Reinforcement Learning (RL) to train a neural network to control a humanoid robot or create lifelike animations at lower cost.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Although motion capture works quite well with human performers it somewhat more difficult with animals, especially wild animals. Specifically, there are challenges to fitting animals with motion capture markers and animals are less likely to act naturally with motion capture markers affixed to them. It would be much more advantageous to animate directly from video of animals, particularly wild animals. The frames of such video can be analyzed, e.g., with image analysis software, to determine the pose of the animal at each frame.

According to aspects of the present disclosure, animation of characters such as animals may be derived from video frames. Specifically, segmentation masks of an animal can be generated from video frames of the animal and from a 3D model of an animal. The more poses of a real animal and the 3D animal model differ the more their segmentation masks differ. A quantitative representation of the difference may be intersection over union, for example.

As is generally understood, Intersection over Union is an evaluation metric used to measure the accuracy of an object detector on a particular dataset. Intersection over Union is used to evaluate the performance of object detectors and Convolutional Neural Network detectors (R-CNN, Faster R-CNN, YOLO, etc.) independent of the algorithm used to generate the predictions. Any algorithm that provides predicted bounding boxes or segmentation masks for an object or character in an image as output can be evaluated using Intersection over Union (IoU). Applying Intersection over Union to evaluate an (arbitrary) object detector typically requires (1) ground-truth bounding boxes (e.g., hand labeled bounding boxes from a testing set that specify where in the image the object is) and (2) the predicted bounding boxes from a model. With these two sets of bounding boxes Intersection over Union (IoU) can be determined as IoU=Area of Overlap/Area of Union.

The closer this value is to 1, the better the prediction.

Figure 1A:
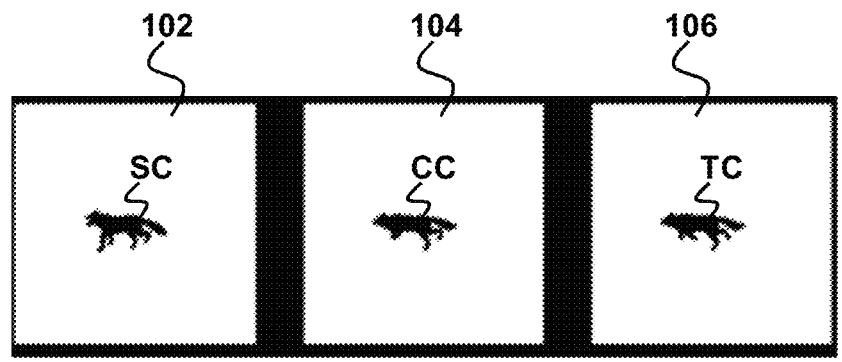
FIG. 1A and FIG. 1B are diagrams illustrating the problem of ambiguity of pose in an image obtained with a monocular camera.

As shown in FIG. 1A, to generate a computer animation frame (target frame) of a source character SC from an input video frame (referred to herein as a source frame) an animation program generates a segmentation mask of a character C in the video image. Image segmentation creates a pixel-wise source mask 102 for the character in the video image. The animation program uses the source mask 102 to model the source character SC and generate a corresponding current animation frame with a corresponding current character CC in some predicted initial pose. A current segmentation mask 104 is then generated from the current animation frame. The computer animation may model the current character CC using three-dimensional data representing the locations and orientations of the current character's joints and extremities. The combination of locations and orientations of the character's joints and extremities is often referred to as the character's pose. The current pose may be optimized by iteratively comparing the current segmentation mask to the source segmentation mask 102 (e.g., by computing IoU) and adjusting the pose to generate an updated current animation frame and current segmentation mask. To determine the correct pose for the character C, a target segmentation mask 106 is generated for a corresponding target character TC in a known pose. The target segmentation mask 106 may be generated from a corresponding three-dimensional target data set representing the locations and orientations of the target character's joints and extremities when the character is in a known pose. The correct pose can be determined by determining the IoU between the current segmentation mask 104 and one or more different target segmentation masks 106. According to some implementations, the current segmentation mask and/or one or more of the target segmentation masks may be edge masks that show only the outline of the pose of the character. A benefit of using edge masks for the segmentation masks is that the edge mask may provide a more accurate pose match. Use of edge masks as the segmentation masks may avoid cases where the virtual character is farther away and thus of a different scale. In such cases the virtual character may fit inside of the target segmentation mask and be obscured by the target mask.

The foregoing process may be repeated for subsequent frames. In addition, physics-based simulations may simulate interactions between the character and its surroundings to evaluate the viability of a given candidate pose determined from the current segmentation mask 104 and/or the target segmentation masks 106. Examples of non-viable poses include, e.g., poses that would result in the character falling. This pose viability evaluation process may be iteratively repeated prior to generating target segmentation masks 106 so that segmentation mask generation is limited to viable poses.

Figure 1B:
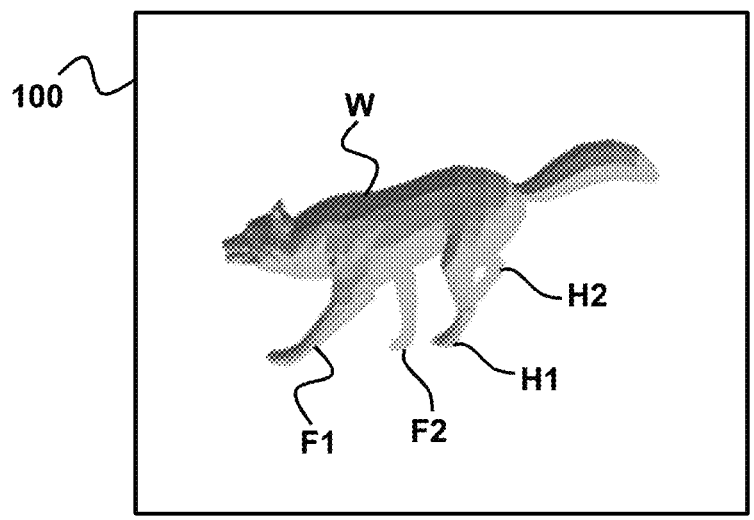

A segmentation mask is a 2D projection of all body points onto an image plane. Due to that it doesn't carry complete information about the original 3D pose. Consequently, there may be ambiguities in the pose of an object in a monocular image. FIG. 1B illustrates an example of such an ambiguity. In FIG. 1B, an image of a wolf W from a frame of video has been analyzed to generate a segmented image 100 as an input for computer animation. In FIG. 1, there is an ambiguity as to which of the wolf's front legs F1 F2, or hind legs H1, H2 is closest to the camera. In order to better match poses in 3D a few techniques can be used.

Disambiguation of Poses

According to aspects of the present disclosure, a computer animation method may use target segmentation masks for multiple camera views of a character to resolve ambiguities in pose. This can be done by minimizing differences between a current segmentation mask and different target segmentation masks for different poses to get the correct pose, e.g., Intersection over Union.

Figure 2A:
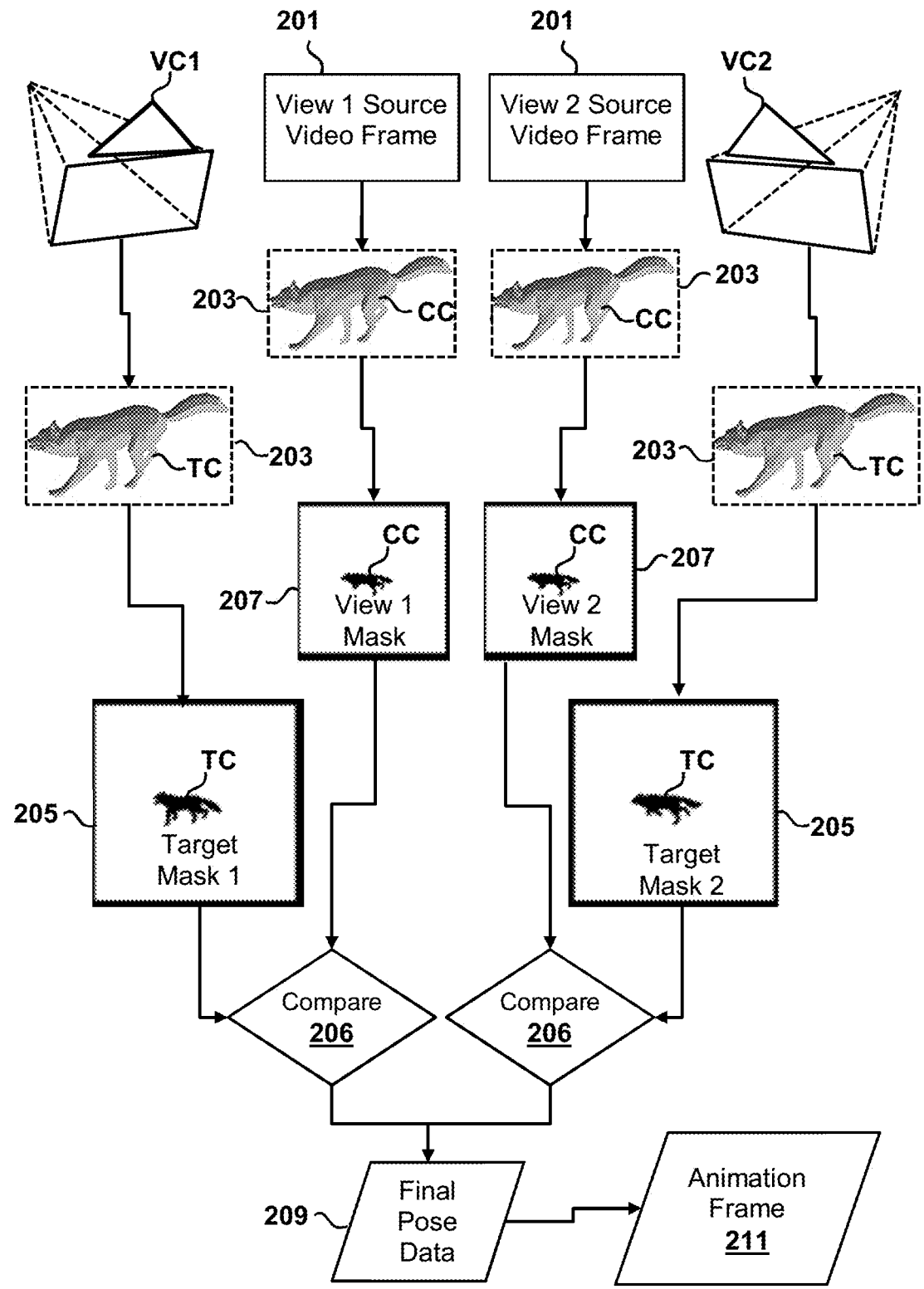
FIG. 2A is a schematic diagram illustrating a method of pose disambiguation in computer animation in accordance with aspects of the present disclosure.
Figure 2B:
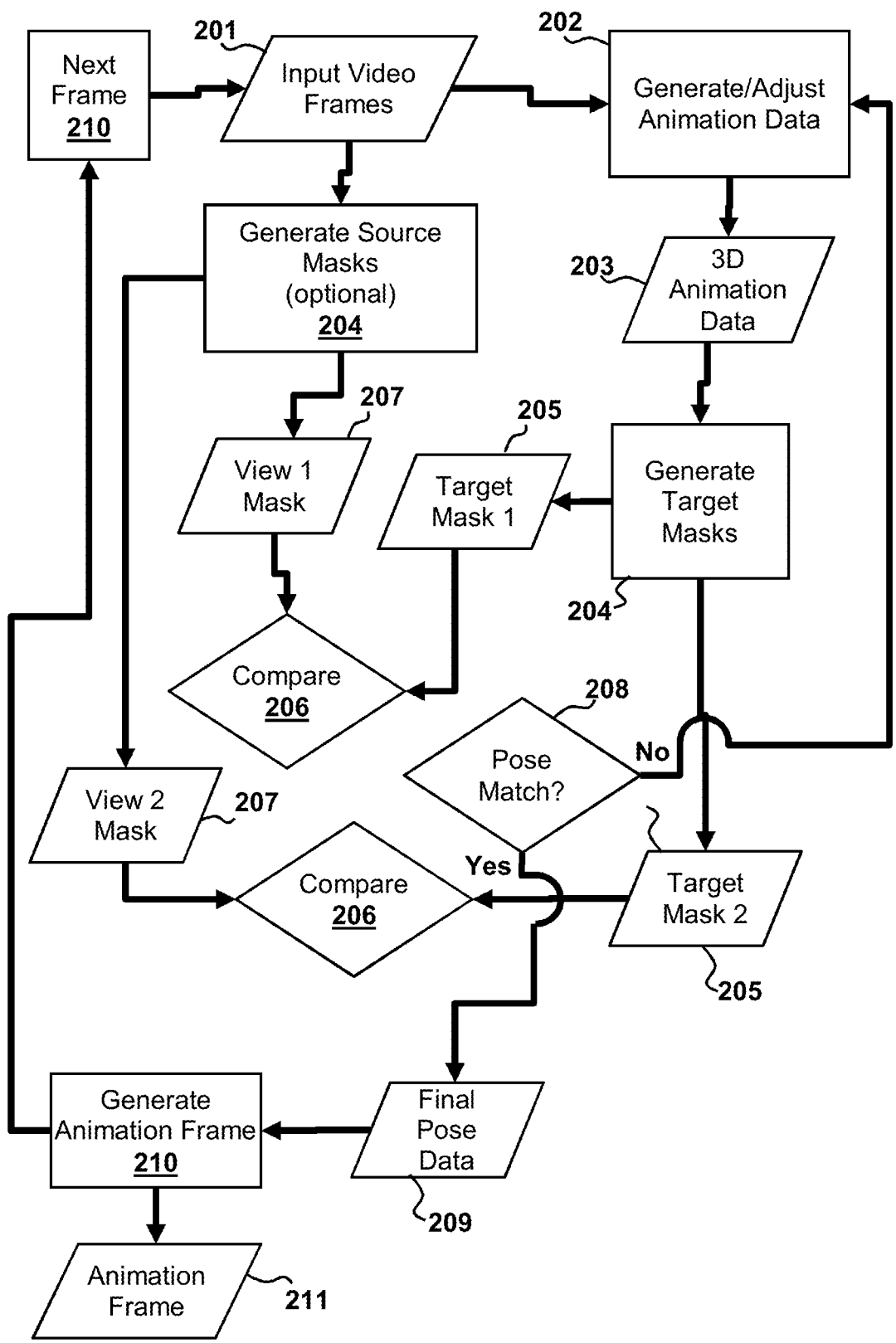
FIG. 2B is a flow diagram illustrating a method of pose disambiguation in computer animation in accordance with aspects of the present disclosure.

FIG. 2A and FIG. 2B depict a possible implementation for the computer animation method according to aspects of the present disclosure. As shown in FIG. 2A, video frames 201 are analyzed to generate a corresponding current segmentation masks 203 for two different contemporaneous views of a character CC from the video frames 201. By way of example and not by way of limitation, the two video frames 201 showing the different contemporaneous views of the character CC may be generated using two different synchronized cameras. As used herein, the term "contemporaneous views" generally means that the views are obtained at approximately the same time, e.g., within one or two frame increments of each other for standard video frame rates. In some implementations, it may be possible to obtain two different images at different angles using a single camera that views the character CC via two or more angled mirrors. In such an implementation, two or more different contemporaneous images and corresponding segmentation masks could be derived from different portions of the same video frame that correspond to the different images. Corresponding target segmentation masks 205 may be generated by first generating three dimensional animation data 203 from the source video frames 201 and using the animation data to generate the target segmentation masks 205. By way of example, and not by way of limitation, the different views of the current character CC may include views oriented at +45° and −45° relative to a reference plane, e.g., an image plane of a virtual camera used to generate the target segmentation masks 205. Likewise, the source masks 207 may be generated from simultaneous frames of video of the character CC taken with two cameras oriented at +45° and −45° relative to a corresponding reference plane.

In the implementation shown in FIG. 2B, the target segmentation masks 205 may be generated from the animation data 203 as follows. As indicated at 202, the input frames 201 are analyzed by a computer animation program to generate the animation data 203. The animation data 203 corresponds to a three-dimensional model TC of the character CC from the video frames 201 in a target pose. The animation program generates the target segmentation masks 205 through a process that involves projecting different views of the model TC from virtual cameras VC1, VC2. Orientations of the virtual cameras may correspond to orientations of real cameras that generated the video frames 201. Source segmentation masks 205 are also generated from the input video frame 201, as indicated at 204. In some implementations, the source segmentation masks 207 may optionally be used in the process of generating or refining the animation data 203.

To determine whether the pose of the three-dimensional model TC shows corresponds to the pose for the character CC in the video frames 201, the target segmentation masks 205 are compared to the corresponding source segmentation masks, as indicated at 206. The results of the comparisons are then analyzed, as indicated at 208, By way of example, and not by way of limitation, at 206 the IoU for each target/source mask comparison may be computed. Then, at 208, the results of each of the IoU computations may be compared to some threshold to determine whether the pose of the model TC corresponds to the pose of the character CC. Depending on the results of the analysis at 208, the animation data 203 may then be adjusted to adjust the pose of the model TC at 202. New target masks may be generated at 204 and compared to the source masks at 206. Adjusting the animation data may include, but is not limited to, adjusting one or more joint angles of the model TC, rotating the orientation of the virtual cameras VC1, VC2 with respect to the reference plane, or some combination of joint angle adjustment and camera orientation adjustment. This process may iterate until the result of the analysis indicates a match between the pose of the model TC and the character CC in the video frames 201. Once a match is obtained, final pose data 209 may then be used to generate an animation frame 211, as indicated at 210.

By way of example, and not by way of limitation, the different views of the current character CC may include views oriented at +45° and −45° relative to a reference plane, e.g., an image plane of a virtual camera used to generate the current source mask 205.

As indicated at 214, the current segmentation masks 207 may then be compared to each of the target segmentation masks 213, 215 to determine final pose data 217 for the current character CC corresponding to a correct pose of the source character in the video frame 201. By way of example, and not by way of limitation, comparing the current masks 205 to the target masks 209, 211 may include computing an Intersection over Union (IoU) between each of the target segmentation masks 213, 215 and the current segmentation mask 207. The IoU values may be compared to a threshold and the correct pose may be determined from the current masks e.g. the current mask that has IoU values for each target masks that at least meet the threshold. In the event that none of the multiple current masks 207 meet the threshold an error state may be determined and the target masks may be adjusted to correct the problem. For example, if neither IoU value is above an IoU threshold or difference between the two IoU values is below a difference threshold, target data 211 may be adjusted to change the pose of the target character TC to a different pose and new target segmentation masks 213, 215 may be generated as indicated at 212. If the IoU values are above the threshold for a certain pose but not others, the animation program may generate final pose data 217 corresponding to the certain pose. The animation program may then use the final pose data 217 to generate a final frame of animation 219 depicting current character CC in the correct pose, as indicated at 216. The foregoing process may then be repeated for the next video frame, as indicated at 218.

Although the forgoing example uses two different views of the model TC and the character CC to generate two target segmentation masks and two corresponding source masks, three or more different views may be used to generate three or more corresponding different target and source segmentation masks. Furthermore, in alternative implementations, the target segmentation masks may be generated from two or more contemporaneous video frames of a target character from two or more corresponding different angles obtained using two or more different cameras.

Pose Disambiguation Apparatus

Figure 3:
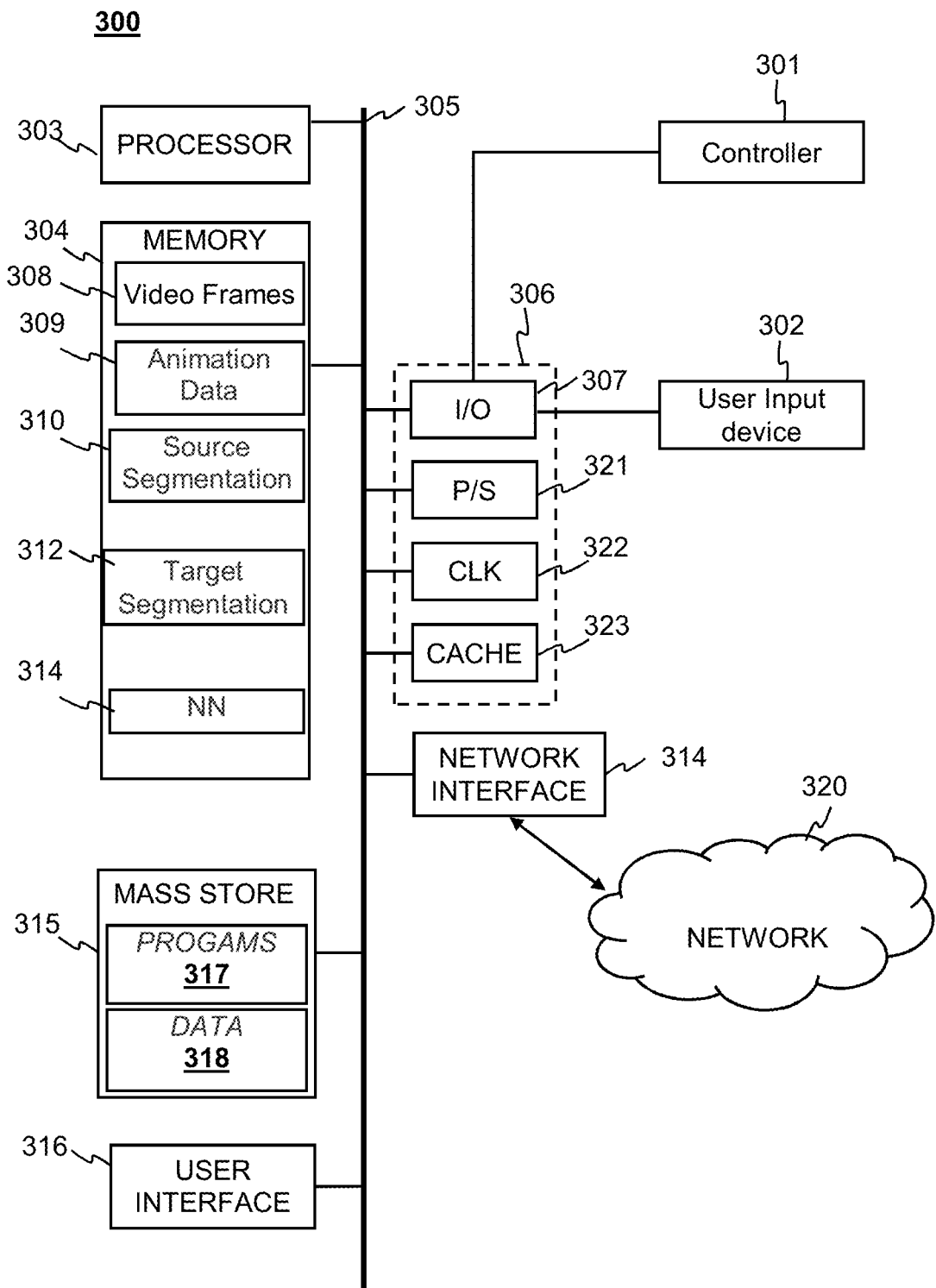
FIG. 3 is a schematic diagram illustrating an apparatus for computer animation involving pose disambiguation in accordance with aspects of the present disclosure.

FIG. 3 depicts an apparatus for computer animation involving pose disambiguation as described, for example, with respect to FIG. 2A and FIG. 2B. The apparatus may include a computing device 300 coupled to a user input device 302. The user input device 302 may be a controller, touch screen, microphone, keyboard, mouse, joystick or other device that allows the user to input information including sound data in to the system. The user input device may be coupled to or include a haptic feedback device, e.g., a vibration motor, force feedback system, ultrasonic feedback system, or air pressure feedback system. Additionally, the system may include a controller 301 for a movable joint for example and without limitation, the controller may control a motor or actuator for a joint on a robot in implementations involving physics-based animation for control of a physical robot.

The computing device 300 may include one or more processor units 303, which may be configured according to well-known architectures, such as, e.g., single-core, dual-core, quad-core, multi-core, processor-coprocessor, cell processor, and the like. The computing device may also include one or more memory units 304 (e.g., random access memory (RAM), dynamic random access memory (DRAM), read-only memory (ROM), and the like).

The processor unit 303 may execute one or more programs 317, portions of which may be stored in the memory 304 and the processor 303 may be operatively coupled to the memory, e.g., by accessing the memory via a data bus 305. The programs 317 may also be stored in a mass storage 315, such as a disk drive, CD-ROM drive, tape drive, flash memory, or the like. The programs may implement instructions that cause the processor unit to carry out an animation method, such as that described above with respect to FIG. 2A and FIG. 2B. The programs may additionally include machine learning algorithms configured to adjust the weights and transition values of Neural Networks (NNs) 314 for implementations involving NNs in a physics-based animation input control scheme as discussed elsewhere herein. Additionally, the Memory 304 may store video frame data 308 and animation data 309 that may be used to generate source segmentation masks 310 and target segmentation masks 312, respectively, as described hereinabove. The video frame data 308, animation data 309, and segmentation masks 310, 312 may also be stored as data 318 in the Mass Store 315. The processor unit 303 is further configured to execute one or more programs 317 stored in the mass store 315 or in memory 304 which cause processor to carry out the one or more of the methods described above.

The computing device 300 may also include well-known support circuits 306, such as input/output (I/O) circuits 307, power supplies (P/S) 321, a clock (CLK) 322, and cache 323, which may communicate with other components of the system, e.g., via the bus 305. The computing device 300 may include a network interface 332 to facilitate communication via an electronic communications network 330. The network interface 332 may be configured to implement wired or wireless communication over local area networks and wide area networks such as the Internet. The computing device 300 may send and receive data and/or requests for files via one or more message packets over the network 320. Message packets sent over the network 320 may temporarily be stored in a buffer in memory 304. The animation frames 308, video frames 309 and segmentation masks 311, 312, 313 may be obtained from remote computing or storage devices via the network 330 and stored partially in the memory 304 and/or mass storage device 315 for use by the computing device 300.

The processor unit 303 and network interface 332 may be configured to implement a local area network (LAN) or personal area network (PAN), via a suitable network protocol, e.g., Bluetooth, for a PAN. The computing device may also include a user interface 316 to facilitate interaction between the system and a user. The user interface may include a monitor, television screen, speakers, headphones or other devices that communicate information to the user.

Monocular Pose Prediction

According to alternative aspects of the present disclosure, consecutive animation frames can be analyzed as a single problem instead of analyzing each individual video frame independently. In such implementations, pose candidates are constructed for the very first animation frame. Each of the pose candidates has the same segmentation mask. But in 3D space the candidate poses for the model TC are distributed as far as possible from each other. Subsequently, a real-life actor-critic trained neural network (NN) analyzes the candidate poses. There are different methods for evaluating the candidate poses. These methods can be combined together in various implementations, which are discussed below.

Figure 4A:
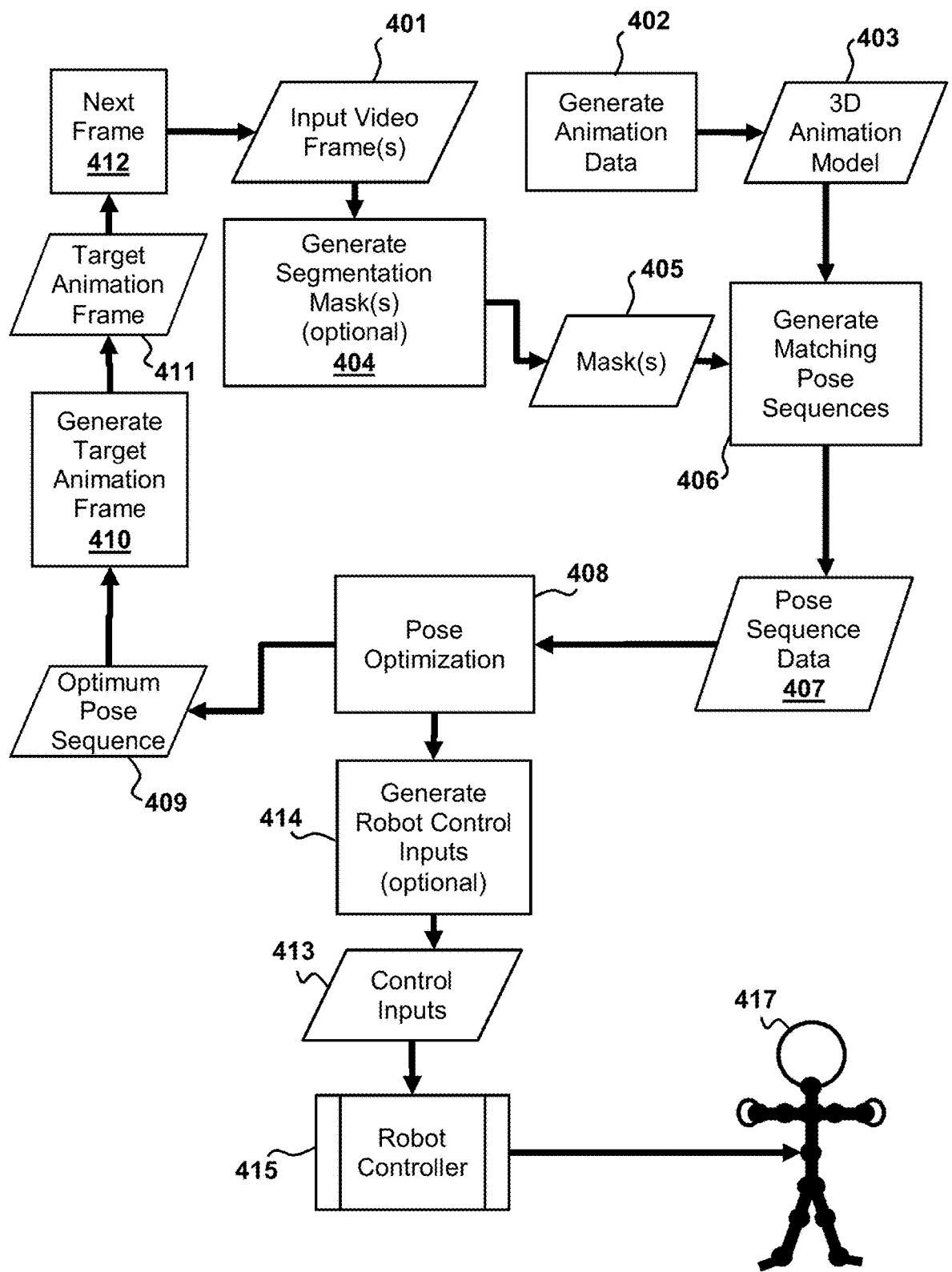
FIG. 4A is a flow diagram illustrating monocular pose prediction in computer animation derived from video in accordance with aspects of the present disclosure.

FIG. 4A depicts an example of a generalized method for monocular pose prediction in computer animation according to aspects of the present disclosure. The method may begin with an input video sequence of frames 401. The input video frame may be obtained from a live feed or from archival footage. Any suitable type of video frame that shows a character may be used. Preferably, the input video frame sequence 401 is in the form of frames of digital video. Alternatively, a non-digital video frame or motion picture frame may be digitized to provide the input video frame sequence 401. An animation program may generate a corresponding sequence of segmentation masks 403 of a character in each frame of the input video frame sequence 401, as indicated at 402. The segmentation mask 403 may be an edge mask. It is noted that, in some implementations, the animation program may receive the segmentation masks 403 from some external source, in which case generation of the segmentation mask is not necessary.

The animation program may generate a three-dimensional animation model 405, as indicated at 404. The animation model 405 includes three-dimensional data representing joints and extremities of an animation character that corresponds to the character in the segmentation mask 403. As indicated at 406, the computer animation program then generates pose sequence data 407 corresponding to possible candidate pose sequences, each sequence containing two or more poses of the character represented by the animation model 405 at different time steps corresponding to consecutive frames of the video sequence. Each pose in each candidate pose sequence is generated in such a way that it has a segmentation mask that matches the segmentation mask of a corresponding frame in the video sequence 401. By way of example, and not by way of limitation, the segmentation masks for different possible candidate poses may be edge masks. Due to the above-mentioned issue of pose ambiguity, it is desirable that the candidate poses are generated in such a way that a distance between candidate poses at each time step is maximized. By way of example, and not by way of limitation each candidate pose may be represented a N multi-dimensional vector of N joint angles in the three-dimensional model 405 and the distance between poses may be calculated with an N-dimensional distance formula. The animation program determines an optimum pose sequence of the plurality of candidate pose sequences, as indicated at 408. The animation program uses the resulting optimum pose sequence data 409 at 410 to generate an animation frame 411. The animation program may then repeat the foregoing process for another input video frame, as indicated at 412.

As noted above, there are different ways of generating the pose sequences at 406 and determining the optimum pose sequence at 408. According to one implementation, pairs of pose candidates from two or more consecutive animation frames in the video sequence 401 may be used as an input to a neural network that performs the pose optimization 408. As part of the pose optimization, a value network (critic) may test the pose candidate sequences. The sequence that gives the highest value is assumed to be the correct sequence. In such implementations, several three-dimensional (3D) poses of the animation model 405 are generated based on the segmentation mask of the first video frame of the sequence 401. All of the poses have segmentation masks that match the segmentation mask of the first video frame in the sequence. The 3D poses are generated such as to be as distant from each other as possible. The distance between poses can be measured, e.g., as an average angle difference between the joints in the 3D model of the animation character. For each 3D pose derived from the first frame in the sequence 401 the optimization process 408 adjusts the 3D pose over time in such a way that for each video frame the segmentation mask of the pose matches the segmentation mask of the corresponding video frame of the sequence 401. During the optimization process the movement of the character represented by the model 405 is simulated by a physics simulation environment. The optimization process 408 makes the segmentation mask for a frame of the sequence 401 match a corresponding projection of a candidate pose of the model 405 and at the same time makes sure that the movement of the animated character is physically consistent, e.g., doesn't cause the animation character to fall or violate joint constraints. A genetic (evolutional) algorithm can be used for this purpose.

In an alternative implementation, several pose candidates may be generated as described above but for each animation frame. All pose candidates for a given animation frame have segmentation masks matching the segmentation mask of a corresponding video frame of the sequence 401. During the optimization process 408 pairs of pose candidates for consecutive video frames may be fed into a Neural Network which has been pre-trained to control the character in a physics simulation environment using similar animations. Pose candidate pairs are then evaluated by the Neural Network. The segmentation masks for the best pose candidate pair should provide the best match with the segmentation masks obtained from the corresponding video frames. At the same time movement of the character in a simulated physics environment must not cause the character to fall or violate joint constraints. The solution consecutively progresses from the first frame pair to the end of the video sequence 401.

In some implementations, the animation program may use an output of the pose optimization process at 408 to generate robot control inputs 413, as indicated at 414. The animation program may supply the control inputs 413 to a robot controller 415, which converts the control inputs to control signals that are transmitted to an articulated robot 417. The robot controller 415 may be implemented in hardware or software. For hardware implementations the optimization process 408 of the animation program provides inputs in a convenient form and the robot controller can convert the inputs to robot commands. For software implementations, the robot controller 415 may be implemented by code running on the same computer system as the animation program. Such robot controller code may be a separate program from the animation program or may be incorporated into the animation program.

As noted above, the pose optimization process 408 may be informed by a physics simulation to evaluate a viability of various combinations of pose combination for sequences of poses of the robot 417 or corresponding animated character. By way of example, the pose optimization process 408 may limit movement of the animated character or robot 417 according to one or more physics-based constraints. Alternatively, the pose optimization process 408 may reject poses that would be inconsistent with operation of the robot 417, e.g., poses that would cause the robot to fall or violate a joint constraint. In some implementations, the pose optimization process 408 may optionally include pose disambiguation using techniques such as those described above with respect to FIG. 2A and FIG. 2B. This could involve generating two or more different candidate target masks from different views of the 3D animation model 405 and comparing the target masks to corresponding masks 403 generated from different contemporaneous views the input video frame 401.

Figure 4B:
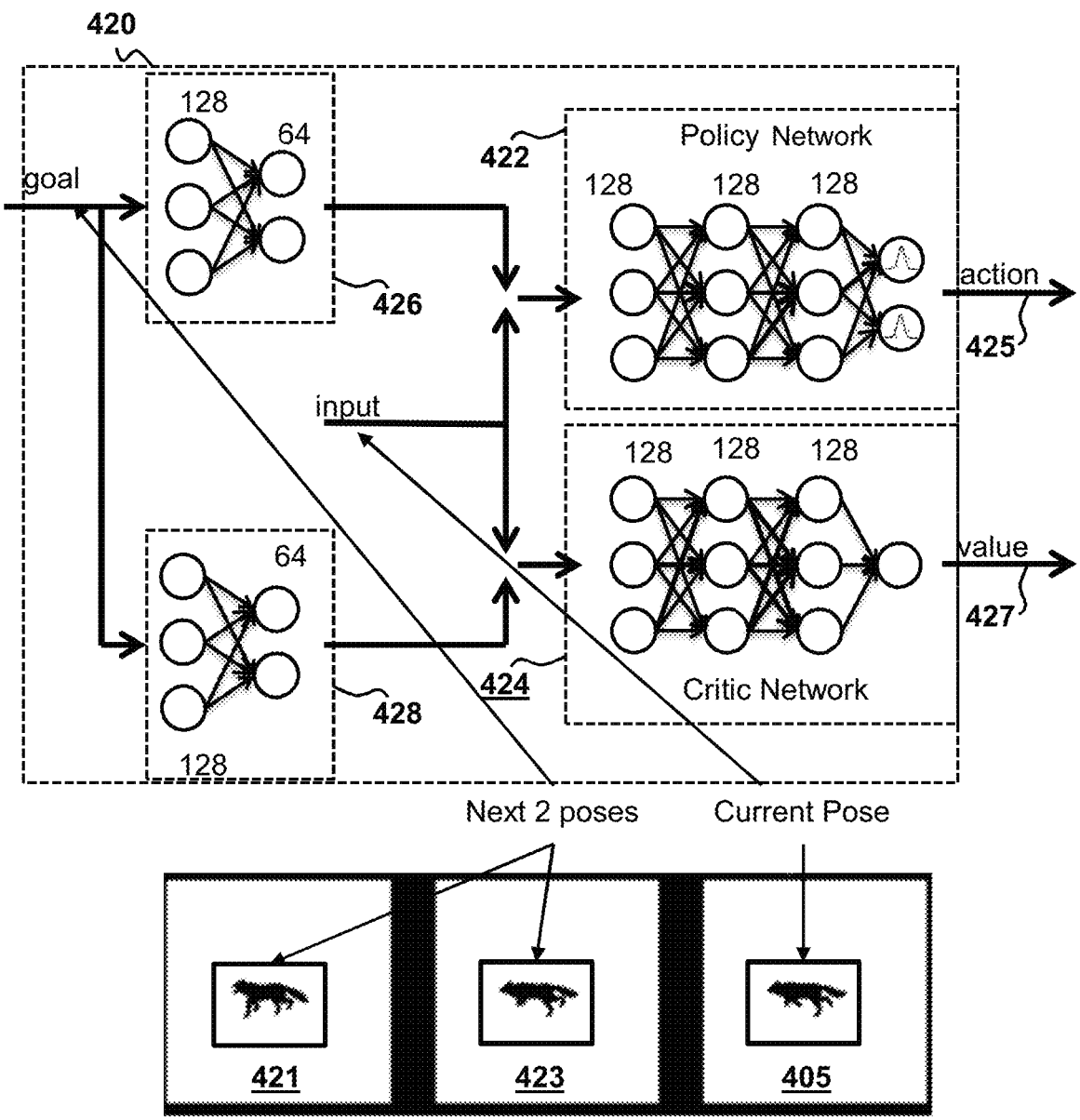
FIG. 4B is a flow diagram illustrating monocular pose prediction in computer animation control of a robot in accordance with aspects of the present disclosure.

FIG. 4B depicts an example of pose optimization 408 for use of monocular pose prediction in computer animation according to aspects of the present disclosure. As shown in FIG. 4B, the pose optimization process 408 may use Neural Networks 420 to fit candidate poses in pose sequences 407 to corresponding segmentation masks 403 and, optionally, generate the control inputs 413. In the illustrated implementation, the inputs to the Neural Networks 420 are the segmentation masks 403 obtained from the video frame sequence 401. In the Example depicted in FIG. 4B, the goals of the Neural Networks 420 are segmentation masks 421, 423 corresponding to candidates for the next two poses. Specifically, the goals may be two consecutive poses taken from a target animation that the robot 417 mimics. The Neural Networks 420 transform the target animation in real time in such a way that it can run on the real robot 417 without causing it to fall over.

The Neural Networks 420 may be trained to determine the next two poses from a current pose. The Neural Networks 420 training may include the use of a character model in a physics simulation. Motion capture or hand animated poses may be used as a target and the Neural Network 420 may trained to replicate the target poses within the constraints of the physics simulation using a machine learning algorithm. The machine learning algorithm and/or Neural Network layout may be for example and without limitation a reinforcement learning algorithm, an imitation learning algorithm or a supervised learning algorithm. The trained Neural Network may be used to output a score based for each of the candidate poses. As a result of the training the score represents the viability of the pose within the simulation. The pose is evaluated on such factors as Stability over the next two frames (e.g., does the character fall over in simulation), do any of the joints violate their constraints (e.g., does an elbow bend backwards), attempt to minimize the distance all joints move, do any of the extremities collide, are the extremities connected to their corresponding joints, etc. Some or all of these evaluation factors may be generated by the neural network and represented by the score or alternatively some or all of these factors may be determined by the user and added to the score. From the candidate poses the best set of poses is selected, this may be done by hand or within the Neural Network through the use of min max layers. For more information on pose determining Neural Networks see concurrently filed application Ser. No. 17/095, 586 (U.S. Patent Application Publication Number: 20220143820).

From the chosen candidate poses a robot may be controlled using the Neural Networks 420. Outputs of the Neural Networks 420 include an action 425 and a value 427. The action 425 corresponds to the control inputs to the robot 415. The value 427 is an internal training algorithm quantity. It is needed only during training step and is used to estimate the effect of random attempts at improvement.

The robot controller 415 provides the commands based on the action 425 to motors in the robot 417. In general, the robot 417 may include movable joints connected by structural elements and sensors. Each joint may be connected to a sensor that is configured to generate sensor values that related to information about the state of the joint. Sensors for physical robots may include for example and without limitation, encoders, potentiometers, linear variable differential transformers, pressure sensors, gyroscopes, gravimeters, accelerometers, resolvers, velocity, or speed sensor. The sensor values for such sensors would correspond to the outputs of such sensors or information derived therefrom. Examples of sensor values from sensors on a robot include, but are not limited to a joint position, a joint velocity, a joint torque, a robot orientation, a robot linear velocity, a robot angular velocity, a foot contact point, a foot pressure, or two or more of these. For animation characters, the sensors may be virtual sensors and the sensor values may simply include data, e.g., position, velocity, acceleration data, related to the state of the movable joint. Examples of sensor values from a robot simulation include, but are not limited to a joint position, a joint velocity, a joint torque, a model orientation, a model linear velocity, a model angular velocity, a foot contact point, a foot pressure, or two or more of these. Position Data from the controller 415 or the animation program may be passed to a motion decision neural network and used as state data during reinforcement learning in conjunction with the pose optimization process 408.

The nature of the control inputs depends on the control parameterization used by the robot controller 415 to control the joints of the robot 417. Commonly used control parameterizations for articulated robots include position control, velocity control, and torque control. One possible implementation employs a hybrid scheme in which a neural network outputs target joint velocities, which may be labeled as position derivatives v. An integrator block integrates the derivatives v into joint positions x according to $x=\int vdt$ before being applied directly to either position derivate (PD) controllers in a simulation or animation or to the actuators of the robot 417. The output of the integrator block may also be used as a feedback signal by routing it into the neural network as input. The integration step may advantageously suppress motor jitter in simulation and control of the robot 417 to visually unobservable levels by smoothing out the robot's reaction to noisy sensors and sensor spikes. The integration can also moderate the robot's movement when the network input enters out-of-distribution areas of the state space during failure scenarios.

In the illustrated example the Neural Networks that generate the action 425 and value 427 split policy and value functions into separate networks 422, 424, with no shared weights. The illustrated policy network 422 and the critic network 424 may each consist of three layers containing the same number of neurons in each layer. Each of the neurons may have the same activation function. By way of example, and not by way of limitation, each of these layers contains 128 neurons and use softsign as their activation function. The network input (observation) is subject to normalization using the running mean and standard deviation. The input may include any or all of the following features: goal orientations, joint sensor readings, action at previous time step, actuator inputs at previous time step, gravity vector in local reference frame, accelerometer readings, gyro readings, and foot pressure sensor readings.

The goal orientations may be represented in axis-angle form and encoded into a latent representation using two encoding layers 426, 428. By way of example, each encoding layer may include a first layer containing 128 neurons coupled to a second layer containing 64 neurons. Each of the neurons may use leaky ReLU activation functions. The action 425 specifies the set of joint position derivatives output by the neural network. The actuator inputs indicate the updated joint positions calculated by integrating the position derivatives. Feeding the action and actuator inputs from the previous time step into the networks introduces a feedback signal.

Exploration occurs during training by sampling the policy network output from the learned Gaussian distributions. Sampling in this manner introduces jitter during training that makes learning difficult as it induces falling. The integration scheme discussed above helps to alleviate the jitter. In addition, instead of sampling random actions from the Gaussian distribution at each time step, with fixed probability ε a random action may be sampled from the policy network 422 and with probability 1-ε the robot 417 executes a deterministic action specified by the mean of the Gaussian. Furthermore, updates may be performed using only samples where exploration noise is applied.

Pose Prediction Apparatus

Figure 5:
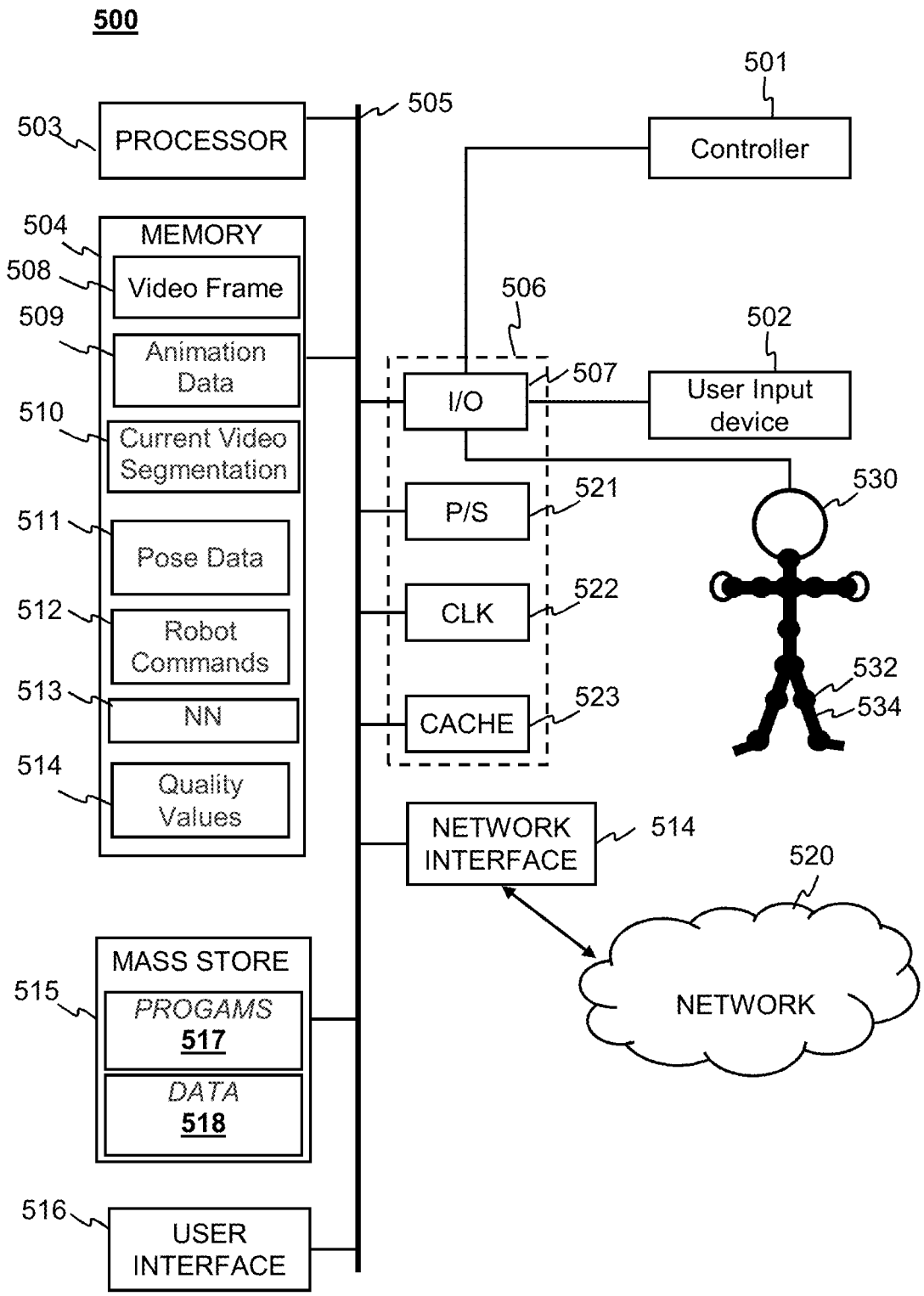
FIG. 5 is a schematic diagram illustrating an apparatus for computer animation involving monocular pose prediction in computer animation in accordance with aspects of the present disclosure.

FIG. 5 depicts an apparatus for computer animation involving monocular pose prediction as described, for example, with respect to FIG. 4A and FIG. 4B. The apparatus may include a computing device 500 coupled to a user input device 502. The user input device 502 may be a controller, touch screen, microphone, keyboard, mouse, joystick or other device that allows the user to input information including sound data in to the system. The user input device may be coupled to or include a haptic feedback device, e.g., a vibration motor, force feedback system, ultrasonic feedback system, or air pressure feedback system. Additionally, the system may include a controller 501 for a movable joint for example and without limitation, the controller may control a motor or actuator for a joint on a robot in implementations involving physics-based animation for control of a physical robot.

The computing device 500 may include one or more processor units 503, which may be configured according to well-known architectures, such as, e.g., single-core, dual-core, quad-core, multi-core, processor-coprocessor, cell processor, and the like. The computing device may also include one or more memory units 504 (e.g., random access memory (RAM), dynamic random access memory (DRAM), read-only memory (ROM), and the like).

The processor unit 503 may execute one or more programs 517, portions of which may be stored in the memory 504 and the processor 503 may be operatively coupled to the memory, e.g., by accessing the memory via a data bus 505. The programs 517 may also be stored in a mass storage 515, such as a disk drive, CD-ROM drive, tape drive, flash memory, or the like. The programs may implement instructions that cause the processor unit to carry out an animation method, such as that described above with respect to FIG. 4A and FIG. 4B. The programs may additionally include machine learning algorithms configured to adjust the weights and transition values of Neural Networks (NNs) 513 for implementations involving NNs in a physics-based animation input control scheme as discussed elsewhere herein. Additionally, the Memory 504 may store video frame data 508 and animation frame data 509. The video frame data 508 may be used to generate segmentation masks 510 for use in pose prediction as described above. Pose data 511 used in pose prediction may also be stored in the memory 504. When used for control of a robot 530, the memory may also store robot commands 512 and quality values 514 generated by the neural networks 513, e.g., as discussed above. The video frame data 508, animation data 509, segmentation masks 510, pose sequence data 511, robot commands 512 and quality values 514 may also be stored as data 518 in the mass storage 515.

The computing device 500 may also include well-known support circuits 506, such as input/output (I/O) circuits 507, power supplies (P/S) 521, a clock (CLK) 522, and cache 523, which may communicate with other components of the system, e.g., via the bus 505. In implementations involving control of a robot 530, the robot commands 512 may be relayed to the robot via the I/O circuits. The computing device 500 may include a network interface 532 to facilitate communication via an electronic communications network 530. The network interface 532 may be configured to implement wired or wireless communication over local area networks and wide area networks such as the Internet. The computing device 500 may send and receive data and/or requests for files via one or more message packets over the network 520. Message packets sent over the network 520 may temporarily be stored in a buffer in memory 504. The animation frames 508, video frames 509 and segmentation masks 511 may be obtained from remote computing or storage devices via the network 520 and stored partially in the memory 504 and/or mass storage device 315 for use by the computing device 500.

The processor unit 503 and network interface 532 may be configured to implement a local area network (LAN) or personal area network (PAN), via a suitable network protocol, e.g., Bluetooth, for a PAN. The computing device may also include a user interface 516 to facilitate interaction between the system and a user. The user interface may include a monitor, television screen, speakers, headphones or other devices that communicate information to the user.

Although certain implementations are described herein in terms of computer animation for the purpose of controlling a robot, aspects of the present disclosure are not so limited. Pose disambiguation and monocular pose prediction are useful in many other applications. Furthermore, although certain implementations are described herein in terms of animation of animals, aspects of the present disclosure are not so limited. For example, the techniques described herein may be used to generate computer animation of human characters and/or robot characters or other moving objects from archival footage or other situations where motion capture is not practical or not possible.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for computer animation, comprising:
    a) generating two or more source segmentation masks from two or more corresponding contemporaneous video images of a character observed at a particular instant in time from two or more corresponding points of view;
    b) generating a three-dimensional model of an animation character corresponding to the character in the two or more contemporaneous video images wherein generating the three-dimensional model of the animation character includes evaluating viability of a pose of the animation character by performing at least two timesteps of physics-based simulations of interactions between the animation, character and a surrounding environment using sensor values related to a joint or to a point of contact between the animation character and the environment, wherein evaluating the viability of the pose of the animation character includes evaluating whether the animation character will fall over in simulation;
    c) generating two or more different target segmentation masks corresponding to two or more different views of the animation character corresponding to the character in the two or more video images:
    d) comparing each of the two or more target segmentation masks to a corresponding one of the two or more source segmentation masks and determining from the comparison whether a pose of the three-dimensional model of the animation character corresponds to a pose of the character in the two or more contemporaneous video images; and
    e) using the three-dimensional model to generate a frame of animation of the animated character when the pose of the three-dimensional model of the animation character corresponds to the pose of the character in the two or more contemporaneous video images.

2. The method of claim 1, further comprising, after d) adjusting the three-dimensional model of the animation character to produce an adjusted model when the pose of the animation character does not correspond to the pose of the character in the two or more contemporaneous video images; and
    f) repeating b), c), d), and e) as necessary until the pose of the animation character corresponds to the pose of the character in the two or more contemporaneous video images, wherein e) includes using the adjusted model to generate the frame of animation.

3. The method of claim 1, wherein the two or more different views of the character in the two or more contemporaneous video images include views oriented at +45° and −45° relative to a reference plane.

4. The method of claim 1, wherein said comparing each of the two or more target segmentation masks to the corresponding one of the two or more source segmentation masks includes computing an Intersection over Union (IoU) between each of the two or more target segmentation masks its corresponding source segmentation mask.

5. The method of claim 1, wherein generating the two or more different target segmentation masks includes generating two or more different animation frames of an animated character from two or more corresponding different angles using three-dimensional animation data, and generating the two or more different target segmentation masks from the two or more different animation frames.

6. He method of claim 1, wherein generating the two or more source segmentation masks includes generating two or more contemporaneous video frames from two or more corresponding different angles with two or more different cameras.

7. The method of claim 1, wherein the two or more source segmentation masks include one or more edge masks.

8. The method of claim 1, wherein the two or more target segmentation masks include one or more edge masks.

9. The method of claim 1, wherein the two or more source segmentation masks include one or more edge masks and wherein the two or more target segmentation masks include one or more different edge masks.

10. An apparatus for computer animation, comprising:
    a processor;
    a memory;
    executable instructions embodied in the memory that, when executed by the processor cause the processor to implement a method for computer animation, the method comprising,
    a) generating two or more source segmentation masks from two or more corresponding contemporaneous video images of a character observed at a particular instant in time from two or more corresponding points of view;
    b) generating a three-dimensional model of an animation character corresponding to the character in the two or more contemporaneous video images wherein generating the three-dimensional model of the animation character includes evaluating viability of a pose of the animation character by performing at least two timesteps of physics-based simulations of interactions between the animation character and a surrounding environment using sensor values related to a joint, or to a point of contact between the animation character and the environment, wherein evaluating the viability of the pose of the animation character includes evaluating whether the animation character will fall over in simulation;
    c) generating two or more different target segmentation masks corresponding to two or more different views of the animation character corresponding to the character in the two or more video images;
    d) comparing each of the two or more target segmentation masks to a corresponding one of the two or more source segmentation masks and determining from the comparison whether the pose of the three-dimensional model of the animation character corresponds to a pose of the character in the two or more contemporaneous video images; and
    e) using the three-dimensional model to generate, a frame of animation of the animated character when the pose of the three-dimensional model of the animation character corresponds to the pose of the character in the two or more contemporaneous video images.

11. The apparatus of claim 10, wherein the method further comprises, after d) adjusting the three-dimensional model of the animation character to produce an adjusted model when the pose of the animation character does not correspond to the pose of the character in the two or more contemporaneous video images; and f) repeating b), c), d), and e) as necessary until the pose of the animation character corresponds to the pose of the character in the two or more contemporaneous video images, wherein e) includes using the adjusted model to generate the frame of animation.

12. The apparatus of claim 10, wherein the two or more different views of the character in the two or more contemporaneous video images include views oriented at +45° and −45° relative to a reference plane.

13. The apparatus of claim 10, wherein said comparing each of the two or more target segmentation masks to the corresponding one of the two or more source segmentation masks includes computing an Intersection over Union (IoU) between each of the two or more target segmentation masks its corresponding source segmentation mask.

14. The apparatus of claim 10, wherein generating the two or more different target segmentation masks includes generating two or more different animation frames of an animated character from two or more corresponding different angles using three-dimensional animation data, and generating the two or more different target segmentation masks from the two or more different animation frames.

15. The apparatus of claim 10, wherein generating the two or more source segmentation masks includes generating two or more contemporaneous video frames from two or more corresponding different angles with two or more different cameras.

16. The apparatus of claim 10, Therein the two or more source segmentation masks include one or more edge masks.

17. The apparatus of claim 10, wherein the two or more target segmentation masks include one or more edge masks.

18. The apparatus of claim 10, wherein the two or more source segmentation masks include one or more edge masks and wherein the two or more target segmentation masks include one or more different edge masks.

19. A non-transitory computer readable medium having executable instructions embodied therein that, when executed by a computer cause the computer to implement a method for computer animation, the method comprising,
   a) generating two or more source segmentation masks from two or more corresponding contemporaneous video images of a character observed at a particular instant in time from two or more corresponding points of view;
   b) generating a three-dimensional model of an animation character corresponding to the character in the two or more contemporaneous video images wherein generating the three-dimensional model of the animation character includes evaluating a viability of a pose of the animation character by performing at least two timesteps of physics-based simulations of interactions between the animation character and a surrounding environment using sensor values related to a joint or to a point of contact between the animation character and the environment, wherein evaluating the viability of the pose of the animation character includes evaluating whether the animation character will fall over in simulation;
   c) generating two or more different target segmentation masks corresponding to two or more different views of the animation character corresponding to the character in the two or more video images;
   d) comparing each of the two or more target segmentation masks to a corresponding one of the two or more source segmentation masks and determining from the comparison whether the pose of the three-dimensional model of the animation character corresponds to a pose of the character in the two or more contemporaneous video images; and
   e) using the three-dimensional model to generate a frame of animation of the animated character when the pose of the three-dimensional model of the animation character corresponds to the pose of the character in the two or more contemporaneous video images.

20. The non-transitory computer readable medium of claim 19, wherein the method further comprises, after d) adjusting the three-dimensional model of the animation character to produce an adjusted model when the pose of the animation character does not correspond to the pose of the character in the two or more contemporaneous video images; and
   f) repeating b), c), d), and e) as necessary until the pose of the animation character corresponds to the pose of the character in the two or more contemporaneous video images, wherein e) includes using the adjusted model to generate the frame of animation.

21. The non-transitory computer readable medium of claim 19, wherein the two or more different views of the character in the two or more contemporaneous video images include views oriented at +45° and −45° relative to a reference plane.

22. The non-transitory computer readable medium of claim 19, wherein said comparing each of the two or more target segmentation masks to the corresponding one of the two or more source segmentation masks includes computing an Intersection over Union (IoU) between each of the two or more target segmentation masks its corresponding source segmentation mask.

23. The non-transitory computer readable medium of claim 19, wherein generating the two or more different target segmentation masks includes generating two or more different animation frames of an animated character from two or more corresponding different angles using three-dimensional animation data, and generating the two or more different target segmentation masks from the two or more different animation frames.

24. The non-transitory computer readable medium of claim 19, wherein generating the two or more source segmentation masks includes generating two or more contemporaneous video frames from two or more corresponding different angles with two or more different cameras.

25. The non-transitory computer readable medium of claim 19, wherein the two or more source segmentation masks include one or more edge masks.

26. The non-transitory computer readable medium of claim 19, wherein the two or more target segmentation masks include one or more edge masks.

27. The non-transitory computer readable medium of claim 19, wherein the two or more source segmentation masks include one or more edge masks and wherein the two or more target segmentation masks include one or more different edge masks.

* * * * *